US006174649B1

(12) United States Patent
Park et al.

(10) Patent No.: US 6,174,649 B1
(45) Date of Patent: Jan. 16, 2001

(54) CINNAMATE-CONTAINING PHOTOPOLYMER FOR ORIENTATION FILM OF LIQUID CRYSTAL DISPLAY (LCD) AND METHOD FOR USING THE PHOTOPOLYMER TO FORM AN ORIENTATION FILM

(75) Inventors: Jae Geun Park; Do Yun Kim; Hwan Jae Choi; Joo Young Kim, all of Daejon (KR)

(73) Assignee: Samsung Display Devices Co., Ltd. (KR)

( * ) Notice: Under 35 U.S.C. 154(b), the term of this patent shall be extended for 0 days.

(21) Appl. No.: 09/189,715

(22) Filed: Nov. 11, 1998

Related U.S. Application Data

(63) Continuation-in-part of application No. 08/951,882, filed on Oct. 16, 1997, now abandoned, and a continuation-in-part of application No. 08/951,570, filed on Oct. 16, 1997, now Pat. No. 5,998,101.

(30) Foreign Application Priority Data

Apr. 25, 1997 (KR) .................................................. 97-15556
Apr. 25, 1997 (KR) .................................................. 97-15557

(51) Int. Cl.[7] ............................ C08F 20/10; C08F 20/22; G02F 1/1337
(52) U.S. Cl. .................. 430/321; 427/520; 427/553; 526/321; 526/326; 525/302; 525/304
(58) Field of Search ...................... 430/321, 20; 522/121, 522/153; 349/124, 123, 127, 135; 525/302, 304; 526/321, 326, 242, 245, 292.4, 292.5, 259, 279, 287, 312; 427/520, 553

(56) References Cited

U.S. PATENT DOCUMENTS

| 3,882,084 | 5/1975 | Tato et al. ............................ 526/245 |
| 5,290,824 | 3/1994 | Mandal et al. ......................... 522/75 |
| 5,464,669 | 11/1995 | Kang et al. ............................. 428/1 |
| 5,539,074 | 7/1996 | Herr et al. ........................... 526/326 |
| 5,705,096 | 1/1998 | Kano et al. ....................... 252/299.4 |
| 5,998,101 | * 12/1999 | Park et al. ........................... 430/321 |
| 5,998,563 | * 12/1999 | Pirwitz et al. ......................... 528/26 |

FOREIGN PATENT DOCUMENTS 63-092609   4/1988   (JP) .

OTHER PUBLICATIONS

Dyaduysha, A. et al., "Peculiarity of an Oblique Liquid Crystal Alignment Induced by a Photosensitive Orientant", *Jpn J. Appl. Phys.*, 1995, 34 (Part 2, No. 8A), L1000–L1002.
Schadt, M. et al., "Surface–Induced Parallel Alignment of Liquid Crystals by Linearly Polymerized Photopolymers", *Jpn. Appl. Phys.*, 1992, 31(Part 1, No. 7), 2155–2164.

* cited by examiner

*Primary Examiner*—John A. McPherson
(74) *Attorney, Agent, or Firm*—Woodcock Washburn Kurtz Mackiewicz & Norris

(57) ABSTRACT

Cinnamate-containing photopolymers for use in liquid crystal display are provided. The photopolymers can be homopolymers or copolymers, and have improved thermostability and photoelectric characteristics. The photopolymers contain a substituted benzene ring and have a weight average molecular weight of from about 1000 to about 100,000. Methods for forming LCD cells using the cinnamate-containing homopolymers and copolymers are also provided.

17 Claims, No Drawings

CINNAMATE-CONTAINING PHOTOPOLYMER FOR ORIENTATION FILM OF LIQUID CRYSTAL DISPLAY (LCD) AND METHOD FOR USING THE PHOTOPOLYMER TO FORM AN ORIENTATION FILM

CROSS-REFERENCE TO RELATED APPLICATION

This application is a continuation-in-part of application Ser. No. 08\951,882, filed Oct. 16, 1997, entitled "Cinnamate-Containing Photopolymer for Orientation Film of Liquid Crystal Display (LCD) and Method for Using the Photopolymer to Form an Orientation Film," now abandoned, and application Ser. No. 08/951,570, filed Oct. 16, 1997, entitled "Cinnamate-Containing Photopolymer for Orientation Film of Liquid Crystal Display (LCD) and Method of Forming the Orientation Film Using the Photopolymer," now U.S. Pat. No. 5,998,101, both applications of which are herein incorporated by reference.

FIELD OF THE INVENTION

The present invention relates to photopolymers for use in orientation films for liquid crystal display (hereinafter "LCD"). More particularly, the present invention relates to cinnamate containing polymers, including homopolymers and copolymers, which have superior stability in their photoelectric characteristics, and to methods of forming orientation films using the photopolymers.

BACKGROUND OF THE INVENTION

A liquid crystal display which can substitute for a cathode ray tube (CRT) has advantages of relatively light weight and low consumption of electricity. In particular, as a thin film transistor-liquid crystal display (TFT-LCD) operates each pixel independently, response time is relatively short and a high quality of resolution of moving images can be obtained. Accordingly, the TFT LCD has many applications, including, for example, notebook computers, wall hangings, televisions and the like.

For orientation of a liquid crystal, an orientation film is formed from a polymeric material. The polymeric material is coated onto an ITO electrode to form an orientation film, and then the orientation film is rubbed with a rubbing cloth of nylon or rayon, in a so-called "rubbing process". Conventionally, a heat resistant polymeric material such as a polyimide is applied by a spin coating or a printing method, which can be readily carried out by a person of ordinary skill in the art, and the rubbing process follows. This conventional method of preparing the orientation film is generally applied in mass production of LCDs because the polymeric material can be easily and rapidly coated onto the ITO electrode. However, the conventional method has shortcomings, including potential damage to the thin film transistor due to static electricity generated during the rubbing process, and potential adverse effects on the orientation film due to dust or fibers from the rubbing cloth. Inorganic materials such as silica ($SiO_2$) have been used to form orientation films, but deposition rates can be unacceptably low for mass production processes.

LCDs can be in one of a number of different "modes", including twisted nematic (TN) mode, in-plane switching (IPS) mode, and vertically aligned (VA) mode. These modes differ from one another in a number of properties including the initial orientation of the liquid crystals, the structure of the thin film transistor, polarized film, operating method of liquid crystal, etc. For example, in a conventional TN mode, the liquid crystal is initially oriented so that is twisted by 90° and an electric field is formed between the upper glass electrode and the lower glass electrode. In contrast, in the IPS mode, the liquid crystal is initially oriented horizontally and an electric field is generated parallel to the layer of liquid crystal. A VA mode LCD has a relatively high contrast ratio and a wide visual angle, as compared to a TN mode LCD. The liquid crystal molecules in a VA mode LCD normally appear black due to an initial orientation vertical to the glass electrodes.

A TN mode LCD has a relatively narrow visual angle, because the liquid crystal molecules are oriented in a particular direction by an electric field. On the other hand, an IPS mode LCD has a relatively wide visual angle, because the liquid crystal molecules rotate parallel to the glass electrodes to produce a small refraction difference in the liquid crystal molecules, and because phase retardation of light passing through the LCD cell is compensated. However, when a rubbing process is applied to an IPS mode LCD, a number of problems can result. First, unwanted backlight transmission through the LCD cell can occur due to non-uniformity of liquid crystal molecules, which is in turn caused by poor orientation of the orientation film. This is referred to as "leaking" of light. Although leaking can be prevented in a color filter process by use of a black matrix, this can cause other problems such as, for example, poor brightness or contrast ratio. Second, an IPS mode LCD has a poorer response time than a TN mode LCD, which is believed to be due to interaction between liquid crystal molecules and the orientation film. Thirdly, an IPS mode LCD has an image sticking which is not observed in a TN mode LCD, which is believed to be due to the structure of the cell and the interaction between liquid crystal molecules and the orientation film.

Generally, a conventional TFT LCD cell is composed of a glass substrate, a thin film transistor device, an indium tin oxide (ITO) transparent electrode and an orientation film. For a TFT LCD to operate, liquid crystal molecules should be initially oriented between the TFT LCD cells. The degree of orientation of the liquid crystal is the most important factor influencing the quality of the LCD. The degree of orientation of a liquid crystal is indicated by the "pretilt angle". The pretilt angle is a fixed angle by which liquid crystal molecules on the surface of an electrode are tilted with respect to the surface. The pretilt angle is dependent on a number of factors including composition of the liquid crystal, type of alignment layer, and rubbing strength. Generally, a TFT-LCD requires a pretilt angle of at least about 1° to 3°, and a STN-LCD (super twisted nematic-liquid crystal display) requires a pretilt angle of at least about 5°.

In recent years, a method of preparing a TFT LCD without using a rubbing process has been developed, called a "non-rubbing process". In the non-rubbing process, a photopolymer is used as the orientation film material. Some examples of the non rubbing process are disclosed in Jpn. J. Appl. Phys., Vol 31, 1992, 2155; U.S. Pat. No. 5,464,669 to Dae S. Kang et al.; and Jpn. J. Appl. Phys. Vol. 34, 1995, L1000. The method disclosed in the Kang patent uses a polyvinyl 4-fluorocinnamate polymer to form an orientation film. A photopolymer contains photosensitive groups which, when exposed to linearly polarized ultraviolet light, respond so that the main chains of the photopolymer are oriented, thus causing orientation of the liquid crystal molecules.

Conventional cinnamate containing photopolymers such as polyvinylcinnamate have poor thermostability, i.e. they soften significantly at the glass transition temperature (Tg). This can destroy orientation of the polymer, thereby destroying orientation of the liquid crystal molecules. Also, because the sealing process for binding two glass electrodes in fabricating an LCD is carried out at an elevated temperature, the photopolymer used in the orientation film should be able to withstand temperatures of at least about 100° C. Furthermore, the conventional cinnamate containing photopolymers do not provide sufficient resolution of moving images, because they do not have a sufficient pretilt angle.

With conventional cinnamate-containing photopolymers used in orientation films for LCDs, the alignment can be broken by a slight change in temperature due to the relatively low glass transition temperature ($T_g$) of the main polymer chain and the side chains. Furthermore, the alignment of the liquid crystal molecules can be broken by a slight impact or an environmental change due to the relatively weak surface stability of the liquid crystals and the orientation films.

In order to overcome the shortcomings of the conventional cinnamate-containing photopolymers, the present inventors have developed new cinnamate-containing photopolymers which can provide improved thermostability, photoelectric characteristics, and pretilt angle of liquid crystal molecules for an orientation film for liquid crystal display. The cinnamate containing photopolymers can be applied to an LCD of a TN (twisted nematic) mode, an IPS (in-plane switching) mode or a VA (vertically aligned) mode.

OBJECTS OF THE INVENTION

An object of this invention is to provide new cinnamate-containing photopolymers useful in forming an orientation film for an LCD in a non rubbing process.

Another object of the invention is to provide new cinnamate-containing photopolymers for forming an orientation film, which are photoelectrically stable when used in fabricating an LCD at elevated temperatures.

A further object of the invention is to provide new cinnamate-containing photopolymers which can provide an improved pretilt angle of liquid crystal molecules.

A still further object of the invention is to provide new cinnamate-containing photopolymers applicable to an LCD in a TN (twisted nematic) mode, an IPS (in plane switching) mode or a VA (vertically aligned) mode.

A still further object of the invention is to provide methods of forming an orientation film of an LCD of a TN (twisted nematic) mode, an IPS (in-plane switching) mode or a VA (vertically aligned) mode, in a non-rubbing process.

Other objects and advantages of this invention will be apparent from the ensuing disclosure and appended claims.

SUMMARY OF THE INVENTION

The cinnamate-containing photopolymers of the present invention, which are useful in making orientation films for LCDs, can be homopolymers or copolymers. The homopolymers or copolymers have improved thermostability, photoelectric characteristics, surface stability and pretilt angle as compared to conventional photopolymers.

The cinnamate-containing photopolymers of the present invention contain one or more substituted benzene rings. While it is not intended that the present invention be bound by any particular theory, it is believed that the presence of the substituted benzene rings provides improved photoelectric characteristics at high temperatures due to increased thermostability and surface stability of the liquid crystal molecules. Exemplary substituent groups for benzene rings in the photpolymers of the present invention include a cyanide group, an alkyl group, a halogen atom and in particular, F, and —$CF_3$. Furthermore, the benzene ring can be contained within or attached to a moiety such as an amide, imide, or ether. If desired, the photopolymers may contain a benzene ring attached to a siloxane group, which is believed to improve adhesion to an ITO substrate.

In one aspect, the present invention provides cinnamate-containing homopolymers of structural formula (I):

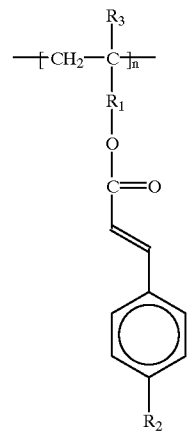

wherein $R_1$ is selected from the group consisting of:

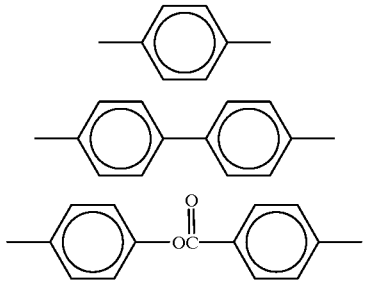

and —$(CH_2)_m$—;

$R_2$ is selected from the group consisting of:

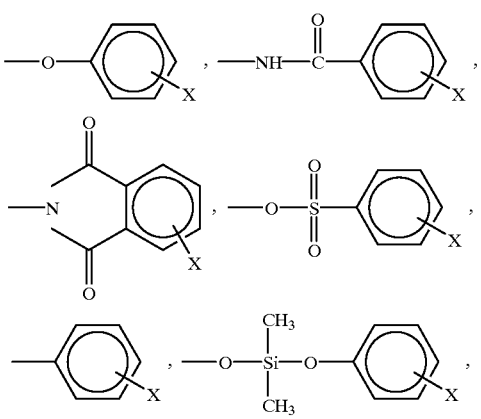

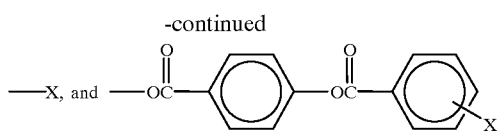

wherein X is halogen, —CN, —CF$_3$ or C$_m$H$_{2m+1}$ (m is an integer of 1 to 6); R$_3$ is H or CH$_3$; and n is an integer representing the degree of polymerization.

Another aspect of the present invention provides cinnamate-containing copolymers of the formula (II):

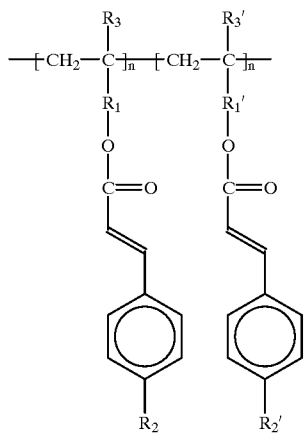

wherein R$_1$, R$_2$ and R$_3$ are as defined above for formula (I), R$_1$', R$_2$' and R$_3$' are selected independently from groups defined in the same manner as R$_1$, R$_2$ and R$_3$, provided that R$_1$ and R$_1$' are different from each other, and R$_2$ and R$_2$' are different from each other.

The present invention also provides methods for forming orientation films and cells for LCDs utilizing the cinnamate-containing photopolymers defined herein.

The cinnamate-containing photopolymers of the present invention have a molecular weight of from about 1,000 to 100,000, but preferably from about 20,000 to about 100,000. "Molecular weight", as used herein, refers to the weight-average molecular weight. Generally, as the molecular weight of a photopolymer increases, the thermostability increases, but the coating ability of the photopolymer on the ITO glass electrode is reduced because solubility of the photopolymer in an organic solvent decreases. Accordingly, the molecular weight of a photopolymer is a significant factor affecting its thermostability and coating ability. According to the present invention, a molecular weight of more than about 20,000 is preferred in order to satisfy general requirements of heat resistance and coating ability.

The cinnamate-containing photopolymers according to the present invention are compounds wherein a mesogen containing a substituted benzene ring, is introduced between a polyvinyl main chain and a cinnamate group. A "mesogen" is a rigid group in a polymer which causes the formation of a "mesophase", which is an ordered region in a liquid crystal, i.e. a region in which the liquid exhibits anisotropic behavior, becoming aligned as in a crystal structure. The introduction of a benzene-containing mesogen between a polyvinyl main chain and a cinnamate group provides improved thermostability and photoelectric characteristics.

A cinnamate-containing photopolymer according to the present invention, or a composition comprising such a cinnamate-containing photopolymer, can be applied to an LCD of a TN (twisted nematic) mode, an IPS (in-plane switching) mode or a VA (vertically aligned) mode.

The cinnamate-containing photopolymers according to the present invention can be applied to an LCD of TN (twisted nematic) mode, IPS (in plane switching) mode or VA (vertically aligned) mode. In particular, when the cinnamate-containing photopolymers of the present invention are applied in an IPS mode by a non-rubbing process, an LCD having a wide visual angle, reduced leaking of light, reduced image sticking and shorter response time can be produced.

One method of forming an orientation film of an LCD according to the present invention comprises preparing a solution of a cinnamate-containing photopolymer in an organic solvent, the solution having a concentration of from about 0.5% to about 2.0% by weight and a viscosity of from about 30 to about 50 centipoise, coating the solution onto an ITO glass electrode to form an orientation film having a thickness of from about 500 Å to about 1,000 Å, drying the orientation film at about 140° C. for about 30 minutes, and exposing the orientation film to polarized ultraviolet light. Representative examples of organic solvents useful in the methods and compositions of the invention are chlorobenzene, N-methylpyrrolidone, dimethylsulfoxide, dimethylformamide, toluene, chloroform, γ-butyrolactone, 2-methoxy ethanol and tetrahydrofuran.

The invention may be better understood by reference to the following examples which are intended for purposes of illustration and are not to be construed as in any way limiting the scope of the present invention, which is defined in the claims appended hereto.

EXAMPLES

Example I
Application to a TN Mode LCD
(1) Synthesis of cinnamate-containing side branch Para-aminocinnamic acid hydrochloride (0.1 mol, 19.96 g) was dissolved in 100 milliliters (ml) of dimethylacetamide and 30 ml pyridine, then 0.1 mol of para-fluorobenzoylchloride was added dropwise while the solution was maintained at 0° C. The solution was allowed to react for about 5 hours at room temperature, and then neutralized to a pH of 6 to 7 with hydrochloric acid. The solution was filtered to obtain a reaction intermediate. The intermediate was washed with water, dried under a vacuum and recrystallized in a solution of dimethylacetamide (10%) and water (90%). A yield of 90% N (para-fluorbenzoyl)-para-aminocinnamic acid in was obtained. Thionyl chloride (1.2 equivalents) and 50 ml of methylene chloride were added. The solution was allowed to react until clear. After the reaction, the solvent and thionyl chloride were removed under a vacuum, and the remaining product was dried. N-(para-fluorbenzoyl)- para-aminocinnamic acid was obtained.

(2) Synthesis of cinnamate-containing photopolymer from polyhydroxystyrene (Photopolymer 1)

Polyhydroxystyrene having a molecular weight of 22,000 was dissolved in tetrahydrofuran (containing 1 equivalent of hydroxy group), and 1 equivalent of triethylamine was added. N-(para-fluorobenzoyl)-para-aminocinnamic acid (1 equivalent) prepared according to step (1) was dissolved in methylene chloride, and the solution was added dropwise to the polymer solution. After reaction for 24 hours, the solution was added dropwise to methanol and precipitated. The precipitate was purified and washed with water and methanol, and dried under a high vacuum. Polyhydroxystyrenyl-p-fluorobenzoylaminocinnamate (hereinafter "photopolymer 1") was obtained.

(3) Preparation of LCD cell

Photopolymer-1 was dissolved in dimethylacetamide to a concentration of 1% by weight. The solution was coated onto a 4 cm×4 cm glass substrate, by spin coating. The spin coating process was carried out in 3,000 rpm. The coated glass substrate was dried for 30 minutes to remove para-chlorobenzene, then dried for 30 minutes at 140° C. Photopolymerization was carried out by exposing the coated substrate to 1 kW polarized ultraviolet light for 15 minutes at an angle of 45°. An orientation film was formed on the substrate. Two substrates were sealed together by an epoxy resin, and then an LCD cell was prepared by injecting a liquid crystal (MLC 6043: a product of Merck Co. of U.S.A.) therebetween. The results of tests carried out on the LCD cell are shown in Table 1.

Example 2
Application to TN Mode LCD
(1) Synthesis of cinnamate-containing side branch Para-aminocinnamic acid hydrochloride (0.1 mol) was dissolved in 100 ml of dimethylacetamide. Isoquinoline was added, then 4-fluorophthalic anhydride was added while the solution was maintained at room temperature. After reacting for 10 hours at 160° C., the solution was poured into water and a solid intermediate was obtained. The intermediate was washed with water and then dried under a vacuum. The intermediate was recrystallized in dimethylacetamide. A yield of 90% of para(para fluorophthalimide) cinnamic acid was obtained. Thionyl chloride (1.2 equivalents) was added, followed by 50 ml of methylene chloride, while the solution was maintained at room temperature. The reaction was allowed to continue until a transparent solution was obtained. After the reaction, the solvent and thionyl chloride were removed under a vacuum and the remaining solid product was dried. Para(para-fluorophthalimide)-cinnamoyl chloride was obtained.

(2) Synthesis of cinnamate-containing photopolymer-2

Polyhydroxystyrene having a molecular weight of 22,000 was dissolved in tetrahydrofuran (containing 1 equivalent of hydroxy) and 1 equivalent of triethylamine was added. Para(para-fluorophthalimide)-cinnamoyl chloride (1 equivalent) synthesized at step (1) was dissolved in methylene chloride at room temperature. The solution was added dropwise to the polymer solution. The resulting solution was filtered and the resulting precipitate was washed with water and ethanol and dried under a high vacuum. Polyhydroxystyrenyl-para-fluorophthalimide-para-cinnamate (hereinafter "photopolymer 2") was obtained.

(3) Preparation of LCD cell

An LCD cell was fabricated in the same manner as in Example 1, and the results of tests of the photoelectric characteristics are represented in Table 1.

Comparative Example 1
Preparation of polymide orientation film by a rubbing process A polyimide (JSR AL-3046: a product of Japan Synthetic Rubber Co.), was coated onto ITO glass substrates to form an orientation film having a thickness of 800 Å. The coated substrates were dried on a hot plate for 1 hour at 200° C.

The orientation film was rubbed with a rubbing roll at 1000 rpm. The rubbed substrates were sealed in the same manner as Example 1 to fabricate LCD cells having a thickness of 5 µm. The test results of photoelectric measurements of the LCD cell are shown in Table 1.

Comparative Example 2
Preparation of LCD cell by polyhydroxystyrenylfluorocinnamate Fluorocinnamoylchloride (0.1 mole, 15.86 g) was dissolved in 100 ml of methylene chloride. Polyhydroxystyrene having a molecular weight of 22,000 was dissolved in tetrahydroxyfuran and 0.1 mole of triethylamine was added. To the resulting solution the chloride solution was added dropwise to form a precipitate. The precipitate was removed by filtration, washed with methanol and dried under a vacuum to give polyhydroxystyrenylfluorocinnamate.

An LCD cell having a thickness of 5 µm was prepared in the same manner as Example 1. The test results of photoelectric measurements of the LCD cell are shown in Table 1.

TABLE 1

| | | Example 1 | Example 2 | Comparative Example 1 | Comparative Example 2 |
|---|---|---|---|---|---|
| voltage (V)/ | $V_{90\%}$ | 1.20 | 1.20 | 1.6–6.7 | 1.29 |
| transmittance | $V_{50\%}$ | 1.80 | 1.70 | 2.1–2.2 | 1.74 |
| (%) | $V_{10\%}$ | 2.40 | 2.40 | 2.8–2.9 | 2.44 |
| response time | $T_{on}$* | 9.0 | 9.0 | 9–10 | 8.0 |
| (msec) | $T_{off}$* | 18.5 | 17.5 | 23 | 16.0 |
| contrast ratio | | 950 | 980 | 500–1000 | 250 |
| visual | ±X | 54° | 55° | 50° | 55–60° |
| angle | –Y | 60° | 60° | 55° | 60° |
| (*) | +Y | 30° | 30° | 20–25° | 31° |
| voltage holding ratio (%) | | 80 | 84 | <<95 | 74 |
| pretilt | 20° C. | 5° | 4° | 3–4° | 1°–5° |
| angle (°) | 60° C. | 2° | 2° | 2–3° | 1° |
| | 140° C. | <<1° | <<1° | <<1° | <<1° | notes:
*$T_{on}$: rising time of liquid crystal molecules when a voltage is applied.
**$T_{off}$: returning time of liquid crystal molecules when a voltage is off.

Test Methods:

Voltage (V)/transmittance (%) and Contrast Ratio: measured using LCD-5000.

Voltage Holding Ratio: measured using VHR.

Pretilt Angle: measured using TBA.

As shown in Table 1, the orientation films of Examples 1 and 2 are superior to the orientation films of Comparative Examples 1 and 2 in voltage/transmittance, response time, contrast ratio, visual angle, 10 voltage holding ratio and pretilt angle.

Example 3
Application to IPS Mode
(1) Synthesis of mesogen-1 having cinnamate

To 100 ml of an aqueous solution of 0.2 mole (8 g) of sodium hydroxide and 100 ml of dimethylsufoxide 0.1 mole (16.42 g) of para-hydroxycinnamic acid was added. The resulting solution was maintained at 0° C. and 0.1 mole (15.86 g) of para-fluorobenzoylchloride was added dropwise. The resulting solution was vigorously agitated. After reaction for two hours, the solution was neutralized with hydrochloric acid to a pH of 6 to 7. The solution was filtered and a solid intermediate was obtained. The intermediate was washed with water and dried under vacuum. The intermediate was recrystallized in ethanol to give para-fluorobenzoyloxycinnamic acid at a yield of 90%. To the para fluorobenzoyloxycinnamic acid, 1.2 equivalents of thionylchloride and 50 ml of methylene chloride were added at room temperature. The resulting solution was allowed to react until a clear solution was obtained. After reaction, the solvent and thionylchloride were removed under vacuum condition and the remaining solid was dried to give para-fluorobenzoylcinnamoylchloride (mesogen 1).

(2) Synthesis of photopolymer having cinnamate (photopolymer 3)

Polyhydroxystyrene having a molecular weight of 22,000 was dissolved in tetrahydrofuran having equivalent of ahydroxy group. To the polymer solution, 1 equivalent of triethylaminewas added. Parafluorobenzoylcinnamoylchloride prepared according to step (1) was dissolved in methylene chloride and 1 equivalent was added dropwise. After reaction for 24 hours, the resulting solution added dropwise to methanol to form a precipitate. The resulting solution was filtered, and the precipitate was washed with water and methanol, and dried under vacuum Polyhydroxystyrenyl-para-fluorobenzoyloxycinnamate (hereinafter photopolymer 3) was obtained.

(3) Preparation of IPS Mode LCD cell

The photopolymer 3 obtained above was dissolved in chlorobenzene to a concentration of 1% by weight. The solution was coated onto a glass substrate by spin coating at 3,000 rpm to form an orientation film. The coated glass substrate was dried for 30 minutes at 140° C. to remove chlorobenzene and irradiated by ultraviolet light oriented vertically to the glass substrate for 5–20 minutes to form cinnamate radicals. The glass substrates were fabricated into a cell by sealing with an epoxy resin to a resuling thickness of 5 μm, and a liquid crystal for use in IPS mode was injected therebetween by capillary action to form an IPS-mode LCD cell. Test results are shown in Table 2.

Comparative Example 3
Preparation of polyimide IPS mode LCD by rubbing process

A photopolymer for use in a rubbing process, polyimide (JSR AL 3046: a product of Japan Synthetic Rubber Co.), was coated onto substrates by a spin coating to form an orientation film having a thickness of 800 Å. The orientation film was rubbed with a rubbing roll at 1000 rpm. LCD cells were prepared in the same manner as in Example 3. The test results of photoelectric characteristics of the LCD cell are shown in Table 2.

TABLE 2

| | Example 3 | Comparative Example 3 |
|---|---|---|
| Contrast ratio | 76.0 | 74.3 |
| Brightness, black | 1.13 | 1.06 |
| Brightness, white | 85.6 | 79.1 |
| Visual angle (C/R) | all > 60° | all > 60° |
| Gray inversion angle | " | " |
| Color reproduction (%) | 59.3 | 59.4 |
| Variation, black (13 points) | 1.4 | 1.4 |
| Variation, white (13 points) | 1.1 | 1.1 |
| Variation, C/R | 1.4 | 1.3 |
| Response time, msec, $T_{on}$ | 22.0 | 37.2 |
| Response time, msec, $T_{off}$ | 27.6 | 32.2 |
| Response time, msec, $T_{total}$ | 49.6 | 69.4 |
| Image sticking | after 30 min., full scale | after 30 min, full scale |

As shown in Table 2, when the photopolymer containing cinnamate is applied for use in IPS mode, a high quality LCD can be achieved.

Example 4
Application to VA Mode
(1) Synthesis of mesogen-2 having cinnamate

To 100 ml of an aqueous solution of 0.2 mole (8 g) of sodium hydroxide and 100 ml of dimethylsulfoxide, 0.1 mole (16.42 g) of parahydroxy cinnamic acid was added. The resulting solution was maintained at 0° C. and 0.1 mole (15.86 g) of parafluorobenzoylchloride was added dropwise. The resulting solution was vigorously agitated. After reaction for further two hours, the solution was neutralized with hydrochloric acid to a pH of 6 to 7. The solution was filtered and a solid intermediate was obtained. The intermediate was washed with water and dried under vacuum, then recrystallized in ethanol. A yield of 90% of para-fluorobenzoyloxycinnamic acid was obtained. To the para-fluorobenzoyloxycinnamic acid, 1.2 equivalents of thionyl chloride and 50 ml of methylene chloride were added at room temperature. The resulting solution was allowed to react until a clear solution was obtained. After reaction, the solvent and thionyl chloride were removed under vacuum and the solid was dried to give para-fluorobenzoylcinnamoyl chloride ("mesogen-2").

(2) Synthesis of photopolyer 4 having cinnamate

Polydroxystyrene having a molecular weight of 22,000 was dissolved in tetrahydrofuran having 1 equivalent of hydroxy groups, and 1 equivalent of triethylaminewas added. To the resulting solution 1 equivalent of para-fluorobenzoylcinnamoyl chloride, prepared above, was added. After reaction for 24 hours, the solution was added dropwise to methanol to form aprecipitate. Theprecipitatewas removed by filtration, washedwithwater, and dried under vacuum. Polyhydroxystyrenyl-para-fluorobenzoyloxycinnamate (hereinafter "photopolymer 4") was obtained.

(3) Preparation of LCD cell for VA mode

Photopolymer-4 prepared above was dissolved in chlorobenzene to a concentration of 1% by weight. The solution was coated onto two glass substrates by spin coating to form an orientation film. The coated glass substrates were dried for 30 minutes at 140° C. to remove chlorobenzene, and exposed to ultraviolet light at an angle of 40° for 5–20 minutes to react the cinnamate. The glass substrates were sealed by epoxy resin and a liquid crystal for use in VA mode was injected therebetween to form a VA mode LCD cell. The results of tests of photoelectric characteristics are shown in Table 3.

Comparative Example 4
Preparation of polyimide VA mode LCD cell by rubbing process A polyimide (JSR AL-3046, product of Japan Synthetic Rubber Co.) was coated onto glass substrates to form an orientation film having a thickness of 800 Å. The orientation film was rubbed with a rubbing roll at 100 rpm. LCD cells were prepared as in above examples. The results of tests of photoelectric characteristics of the LCD cell are shown in Table 3.

TABLE 3

| | Example 4 | Comparative Example 4 |
|---|---|---|
| Contrast ratio | 527 | 518 |
| Brightness, black (od/cm$^2$) | 1.13 | 1.02 |
| Brightness, white | 595.5 | 528.4 |
| Visual angle (C/R) | upper, left & right: 67° lower: 38° | upper, left & right: 67° lower: 38° |
| Color reproduction (%) | 62.3 | 63.4 |
| Variation, black (13 points) | 1.7 | 1.8 |
| Variation, white | 1.3 | 1.2 |
| Variation, C/R | 1.6 | 1.5 |
| Response time, msec, $T_{on}$ | 33.2 | 31.2 |
| Response time, msec, $T_{off}$ | 10.4 | 9.2 |
| Response time, msec, $T_{total}$ | 43.6 | 40.4 |

As shown in Table 3, when the photopolymer containing cinnamate is applied in VA mode, a high quality LCD can be achieved.

Furthre modifications of the inventioon will be apparent to those skilled in the art and all such modifications are deemed to be within the scope of the invention as defined in the following claims.

What is claimed is:

1. A cinnamate-containing photopolymer for use in orientation films for liquid crystal display, having the formula:

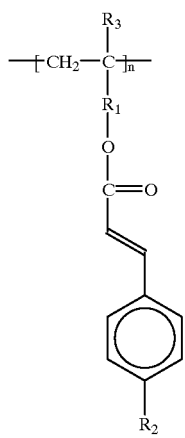

wherein $R_1$, is selected from the group consisting of:

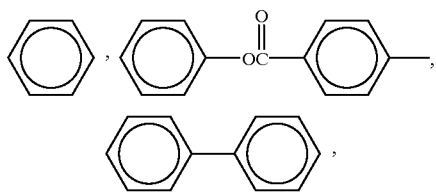

and $-(CH_2)_m-$;

$R_2$ is selected from the group consisting of:

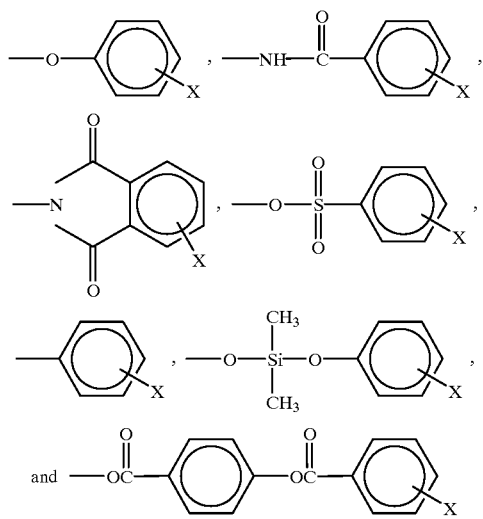

wherein X is a halogen, $-CN$, $-CF_3$ or $C_mH_{2m+1}$; m is an integer of 1 to 6; $R_3$ is H or $CH_3$; and n is an integer representing the degree of polymerization.

2. The cinnamate-containing polymer of claim 1 wherein $R_2$ is

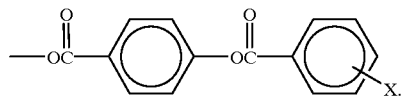

3. A method of forming an orientation film of a liquid crystal display, which comprises applying the photopolymer of claim 2 to a TN mode display.

4. A method of forming an orientation film of a liquid crystal display, which comprises applying the photopolymer of claim 2 to a IPS mode display.

5. A method of forming an orientation film of a liquid crystal display, which comprises applying the photopolymer of claim 2 to a VA mode display.

6. A photopolymer according to claim 1, having a weight average molecular weight of from about 1,000 to about 100,000.

7. A photopolymer according to claim 1, having a weight average molecular weight of from about 20,000 to about 100,000.

8. A method for forming an orientation film for liquid crystal display, comprising the steps of:

preparing a solution of a photopolymer according to either one of claim 1 in an organic solvent so that the polymer concentration of from about 0.5% to about 2.0% by weight and the solution has a viscosity of from about 30 to about 50 centipoise;

coating said solution onto an ITO glass substrate to form an orientation film having a thickness of from about 500 to about 1000 Å;

drying said orientation film at about 140° C. for about 30 minutes; and exposing said orientation film to linearly polarized ultra-violet light.

9. The method of forming an orientation film according to claim 8, wherein said organic solvent is selected from the group consisting of chlorobenzene, N-methylpyrrolidone, dimethylsulfoxide, dimethylformamide, toluene, chloroform, butyrolactone, 2 methoxy ethanol and tetrahydrofuran.

10. The method of forming an orientation film according to claim 8, wherein said coating step is carried out by a spin coating or a printing method.

11. A method of forming an orientation film of a liquid crystal display, which comprises applying the photopolymer of either one of claim 1 to a TN mode display.

12. A method of forming an orientation film of a liquid crystal display, which comprises applying the photopolymer of either one of claim 1 to a IPS mode display.

13. A method of forming an orientation film of a liquid crystal display, which comprises applying the photopolymer of either one of claim 1 to a VA mode display.

14. A cinnamate-containing photopolymer for use in orientation films for liquid crystal display, having the formula:

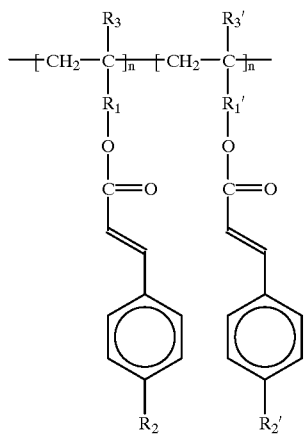

wherein $R_1$ and $R_1'$ are independently selected from the group consisting of:

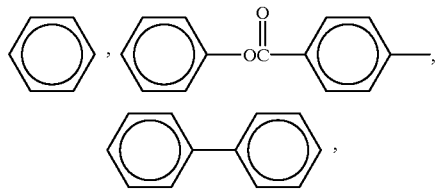

and $-(CH_2)_m-$;

$R_2$ and $R_2'$ are independently selected from the group consisting of:

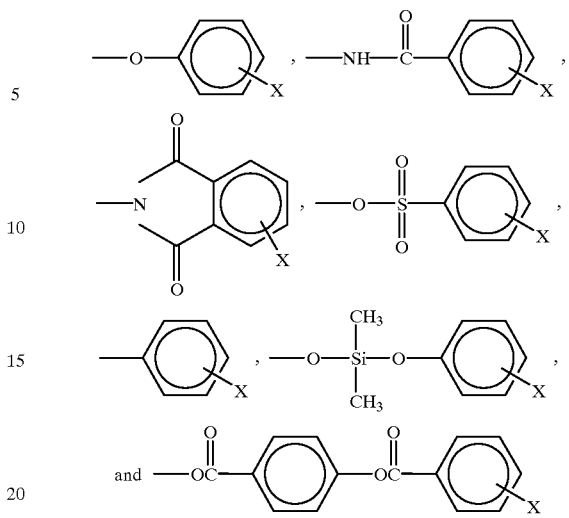

wherein X is a halogen, —CN, —CF$_3$ or $C_mH_{2m+1}$; m is an integer of 1 to 6; $R_3$ is H or CH$_3$; and n and n' are integers representing the degree of polymerization, provided that $R_1$ and $R_1'$ are different and $R_2$ and $R_2'$ are different.

15. A method of forming an orientation film of a liquid crystal display, which comprises applying the photopolymer of claim 14 to a TN mode display.

16. A method of forming an orientation film of a liquid crystal display, which comprises applying the photopolymer of claim 14 to a IPS mode display.

17. A method of forming an orientation film of a liquid crystal display, which comprises applying the photopolymer of claim 14 to a VA mode display.

* * * * *